United States Patent [19]

Ceraso

[11] Patent Number: 5,637,376
[45] Date of Patent: Jun. 10, 1997

[54] AUTOMATIC MACHINE FOR ASSEMBLING PILES OF PACKAGES, INCLUDING COPPER LAMINAE, TO MAKE PLASTIC LAMINATES FROM BANDS ARRANGED SERPENTINEWISE

[75] Inventor: Bruno Ceraso, Milan, Italy

[73] Assignee: Cedal S.R.L., Milan, Italy

[21] Appl. No.: 535,127

[22] PCT Filed: Sep. 10, 1993

[86] PCT No.: PCT/IT93/00105

§ 371 Date: Oct. 10, 1995

§ 102(e) Date: Oct. 10, 1995

[87] PCT Pub. No.: WO94/23948

PCT Pub. Date: Oct. 27, 1994

[30] Foreign Application Priority Data

Apr. 9, 1993 [IT] Italy ............................ MI93A0728

[51] Int. Cl.⁶ ........................... B32B 3/04; B32B 31/00
[52] U.S. Cl. .......................... 428/126; 156/204; 156/223; 156/226; 156/227; 156/379.7; 156/361; 156/459; 156/580

[58] Field of Search .................... 428/124, 126; 156/204, 223, 226, 227, 379.7, 361, 459, 580

[56] References Cited

FOREIGN PATENT DOCUMENTS 93000224 10/1993 Italy .

*Primary Examiner*—Alexander Thomas
*Attorney, Agent, or Firm*—Michael J. Striker

[57] ABSTRACT

Automatic machine (110) for assembly of piles (45) of packages for plastic laminates comprising a feed unit with two carriages (60, 80) each carrying two reels of bands respectively of copper (20, 22) and of insulating material (21, 23), and a hoisting unit (120) for the work table, the pile (45) being formed by causing the carriages (60, 80) to move back and forth cross the work table, the bands (12–15) being held in position by special devices (181, 182) before each stroke made by the carriages (60, 80), there being placed after each bend at 180° of the bands (12–15), alternatingly, an intermediate sheet (30) and a set of sheets (35, 36) of prepreg.

9 Claims, 16 Drawing Sheets

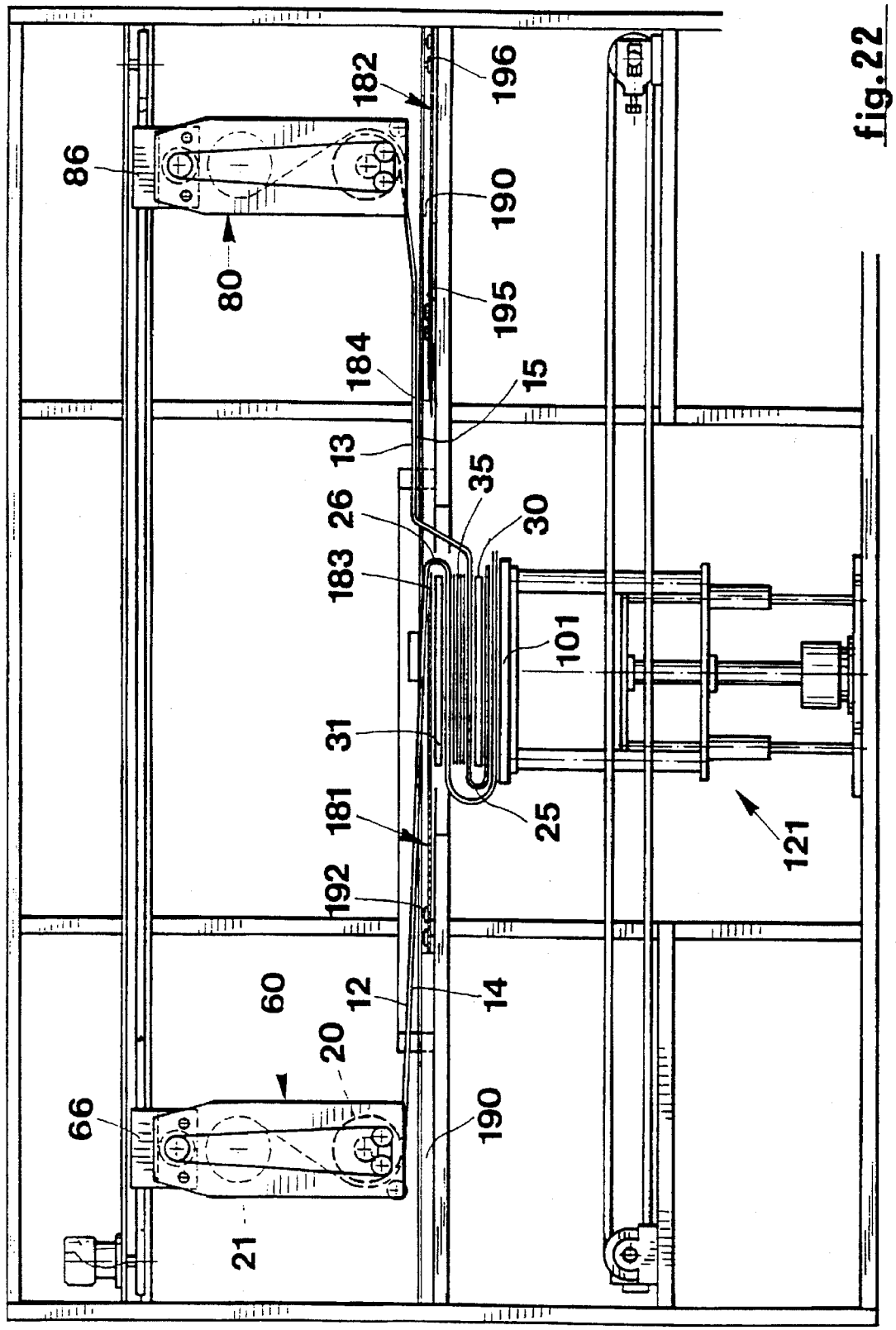

AUTOMATIC MACHINE FOR ASSEMBLING PILES OF PACKAGES, INCLUDING COPPER LAMINAE, TO MAKE PLASTIC LAMINATES FROM BANDS ARRANGED SERPENTINEWISE

The invention concerns a pile of packages, with copper laminae, for making plastic laminates formed by bands laid in serpentine fashion, a process for forming said pile and an automatic machine for forming said pile by means of said process.

The Italian patent application No. MI93 000224 of 10 Feb. 1993 discloses a process for obtaining a pile of packages, including copper laminae, from continuous serpentine-laid bands having flat metal sheets placed between the packages. Insulating sheets are laid between said sheets and the metal bands.

The above invention discloses a machine that automatically forms a pile of packages similar to that disclosed by the above Italian patent application, the sheets of insulating material possibly being replaced by serpentine-wise laid bands associated to the metal bands. Subject of the invention is therefore an assembly machine for piles of packages to make plastic laminates that include laminae, especially of copper, made from metal bands, especially of copper, laid serpentinewise between one set and another of sheets of prepreg with flat sheets laid between packages.

Said assembly machine comprises:

a longitudinal horizontal oblong work surface in which there is a central rectangular opening to receive a work table on which the piles of packages are formed, a unit for feeding in metal bands on one or more carriages each supporting at least one reel of metal band, especially copper, translating on parallel guides from one side of the work table to the other, a unit to support and raise the work table, a stabilizing unit with two locking devices, translatable as required, along longitudinal guides, from their idle positions one on each side of the working surface, for holding down, as the working sequence requires, the pile of packages being formed on the work table, an electronic drive unit for programming the sequence of operations and for synchronising all the movements.

By making the carriages move back and forth across the work table and by placing, at the start of each sequence, the extremity of one or more metal bands on said table, laying on said extremity, after each alternating movement of said carriages, a set of sheets of prepreg and intermediate sheets, the pile of packages will be gradually formed, with metal bands laid serpentinewise and describing bends at 180° in one direction and then in the other between one package and the next.

By operating the hoisting unit the work table can be slowly lowered during formation of the pile to keep the upper surface substantially in line with the work surface. The stabilizing unit, placed at the end of the work table opposite that towards which the bands are oriented, moves, during movement of the carriages towards that end of the work table, onto the pile being formed and holds it firm to facilitate the bands in describing the 180° bend, in one direction and then in the other at each stroke of the carriages.

On each carriage, together with the reel of metal band, a reel of insulating band can be associated. The serpentine that winds between one package and another therefore has a metal face and an insulating face. The insulating face matches with the intermediate sheets while the metal face matches with the set of prepreg sheets. In a preferred version the machine has two reel-carrying carriages.

The work sequence starts with the two carriages placed at one end of the work table laying upon it in the following order: the associated ends of an insulating band, of a metal band, the associated ends of the second metal band and of the second band of insulating material.

By causing the two carriages to make alternating movements from one side of the work table to the other, and by placing on the pile being formed an intermediate sheet alternating with a set of prepreg sheets, at each stroke of the carriage and therefore at each 180° bend of a band, the pile of packages is gradually formed.

The feed carriages preferably carry two reels each, a lower one for the metal band and an upper one for the insulating band, their axes being parallel and orthogonal to the direction of carriage movement.

The two reels are wound in opposite directions. The insulating band passes round the reel carrying the metal band.

At the lower end of each carriage parallel to the reel, there is an idle roller for guiding the bands on the side opposite to the direction in which the lower reel unwinds. The lower reel is motor driven being drawn by a pair of small shafts side by side projecting inward at one side of the carriage.

These small shafts, on which one end of the shaft supporting the lower reel rests freely, are rotated by a continuous chain which in turn is drawn by an electric ratiomotor.

On starting up said ratiomotor the reel carrying the metal band pays out said band together with the insulating band drawn along with the metal one by friction. The stabilizer unit comprises a pair of pressers each formed of a vertical frame transversal to the work surface. Said frame comprises an upper bar that supports a lower horizontal smaller bar by means of two vertical rods that slide axially inside two columns fixed to said upper bar, worked by master cylinders. The frame is hung from longitudinal guides above the work surface and is operated by electric ratiomotors.

It follows that by operating said ratiomotors and said master cylinders, the two pressers can be moved as needed from their idle positions at the side of the work table to a functioning position above said table and, aided by suitable elastic means, generate adequate pressure on the pile of packages being formed.

This pressure mainly serves to hold the various component parts of the pile in position when the carriages pass from one side of the work table to the other to make the bands describe a bend of 180°.

In another version of the machine the stabilizer unit comprises two lateral longitudinal guides for two rectangular horizontal laminae that slide, as required, from idle positions on either side of the work table to a position above said work table.

This sliding movement is worked by master cylinders or by some other driving means.

During formation of the pile, when the stroke made by one carriage is about to start, in order to cause the bands to form a bend of 180°, the lamina on the side opposite said carriage, in relation to the work table, projects out over the pile in course of formation.

In this way, as soon as the carriage begins its stroke the front edge of the lamina reacts against the band, and as a consequence of the stroke made by the carriage, facilitates formation of the 180° bend around said edge. When the pile being formed has been lowered to keep its upper surface in line with the work surface, and just when the other carriage is about to start a stroke in the direction opposite to that of the first one, the second lamina moves from its idle position towards the pile so as to facilitate formation of another 180° bend in the opposite direction to the former one, and so on.

The above-mentioned hoisting unit comprises a means for lifting with four upper columns on which the work table is laid.

The assembly machine here described also comprises a discharging unit for the completed piles of packages. Said discharging unit consists of two continuous longitudinal chains operating on parallel vertical planes on either side of the work table and under the work surface. The horizontal distance between the two chains is less than the width of the work table.

Said chains are supported at one end by a shaft driven by an electric ratiomotor.

Consequently, on completion of a pile of packages, when the lifting means lowers the work table, said table rests on said chains detaching itself from said lifting means which descends to a lower level.

Starting up the ratiomotor, said work table together with the completed pile lying on it, is translated below the work surface to one end of the machine where the pile is collected.

After its collection, the chains return the work table to the position occupied by the lifting means which, moving upwards, brings the table to the opening in the work surface for execution of the next sequence of operations. Another subject of this present invention is a process for assembling a pile of packages, with metal laminae especially of copper, to make plastic laminates from metal bands, especially of copper, laid serpentinewise, forming bends of 180° between one set of prepreg sheets and another with flat intermediate sheets laid between the packages.

In accordance with this process the metal bands are fed in off two motor driven reels turning respectively on two carriages that slide along and above the oblong work surfaces in which, in a specially made machine, there is a central aperture.

The metal bands on said reels are associated to bands of insulating material similarly fed in from two reels also carried by said carriages but above the reels paying out metal bands.

The pile of packages is formed on a work table supported by an underlying motor driven hoisting device. Special means are provided to hold the pile firm and particularly the bands when they begin making the 180° bend and while said bend is in progress.

The working sequence begins with the two carriages at one end of the work table, there being laid on said table in the following order: the associated ends of an insulating band and of a metal band, the associated ends of the second insulating band and of the second metal band. Moving the carriages alternatingly from one side of the work table to the other and laying on the pile, at each stroke of a carriage and therefore at each 180° bend of a band, an intermediate sheet and, alternatingly a set of sheets of prepreg, the pile of packages is gradually formed. These sequences of work lead to formation of a pile of packages obtained by a succession of: insulating sheet, copper lamina, set of prepreg sheets, copper lamina, insulating sheet, intermediate sheet, insulating sheet, and so on.

The copper and insulating sheets are laid serpentinewise between sheets of prepreg and intermediate sheets, the insulating sheer matching with the surface of the intermediate sheets and the copper laminae matching with the surfaces of the sets of prepreg.

Another subject of this present invention is a pile of packages for plastic laminates, each having metal laminae especially of copper, made with a pair of metal bands especially of copper laid serpentinewise and forming bends at 180° facing in one direction and then in the opposite one, between one set and the next of sheets of prepreg and with flat intermediate metal sheets between the packages.

A pair of insulating bands is associated to the pair of metal bands outside which the insulating bands are laid.

Starting from the beginning therefore, the pile of packages consists of: insulating band, metal band, set of sheets of prepreg, second metal band, second insulating band, intermediate metal band, insulating band, and so on until completion of the pile.

The invention possesses evident advantages.

Formation of a pile of packages to make plastic laminates is greatly facilitated and means a saving of time, labour and cost due both to the process followed and to the characteristics of the assembly machine.

Composition of the layers, consisting of pairs of metal bands associated to insulating bands not only makes possible endothermic heating of the piles of packages for plastic laminates, as disclosed in the above-mentioned patent application, but also a much more rational and efficient use of the automatic machine.

The pile of packages comprising a pair of copper bands and a pair of insulating bands is in itself compact, orderly, easy to prepare and heat by electricity, as well as low in cost.

The disclosure here described therefore offers great advantages for the production of plastic laminates generally. Characteristics and purposes of the invention will be made still clearer by the following examples of its execution illustrated by diagrammatically drawn Figures.

BRIEF DESCRIPTION OF THE DRAWINGS

FIGS. 19–22 The second version of the assembly machine in the stages respectively corresponding to those shown in FIGS. 9–12, with a stabilizing blade laid upon the pile of packages being formed.

Figure 1:
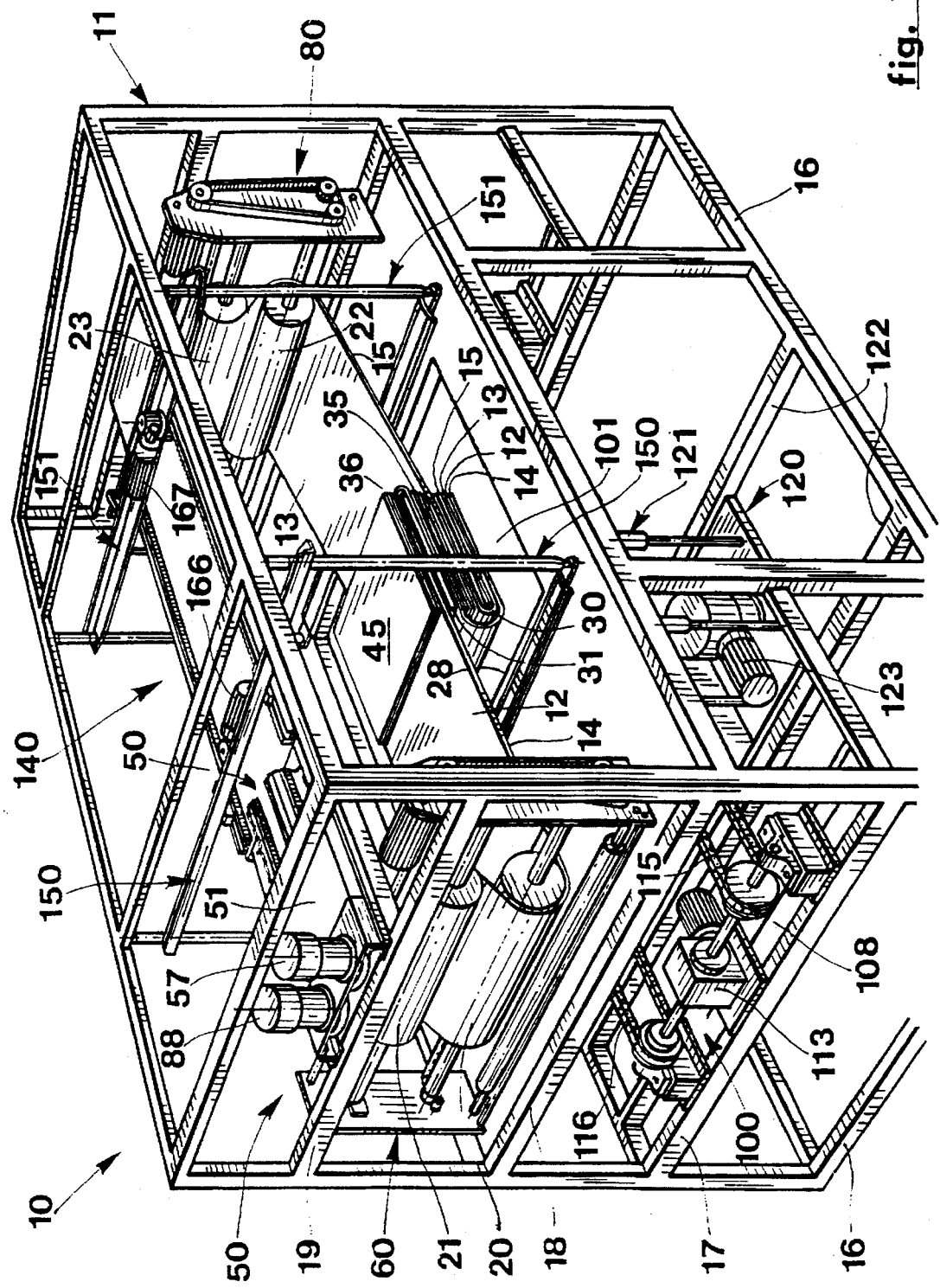
FIG. 1 The assembly machine, seen in perspective, for a pile of packages of plastic laminates with a central work table, feeder of components with two carriages and unit for stabilizing the pile being formed, with two vertically operating presesers.
Figure 2:
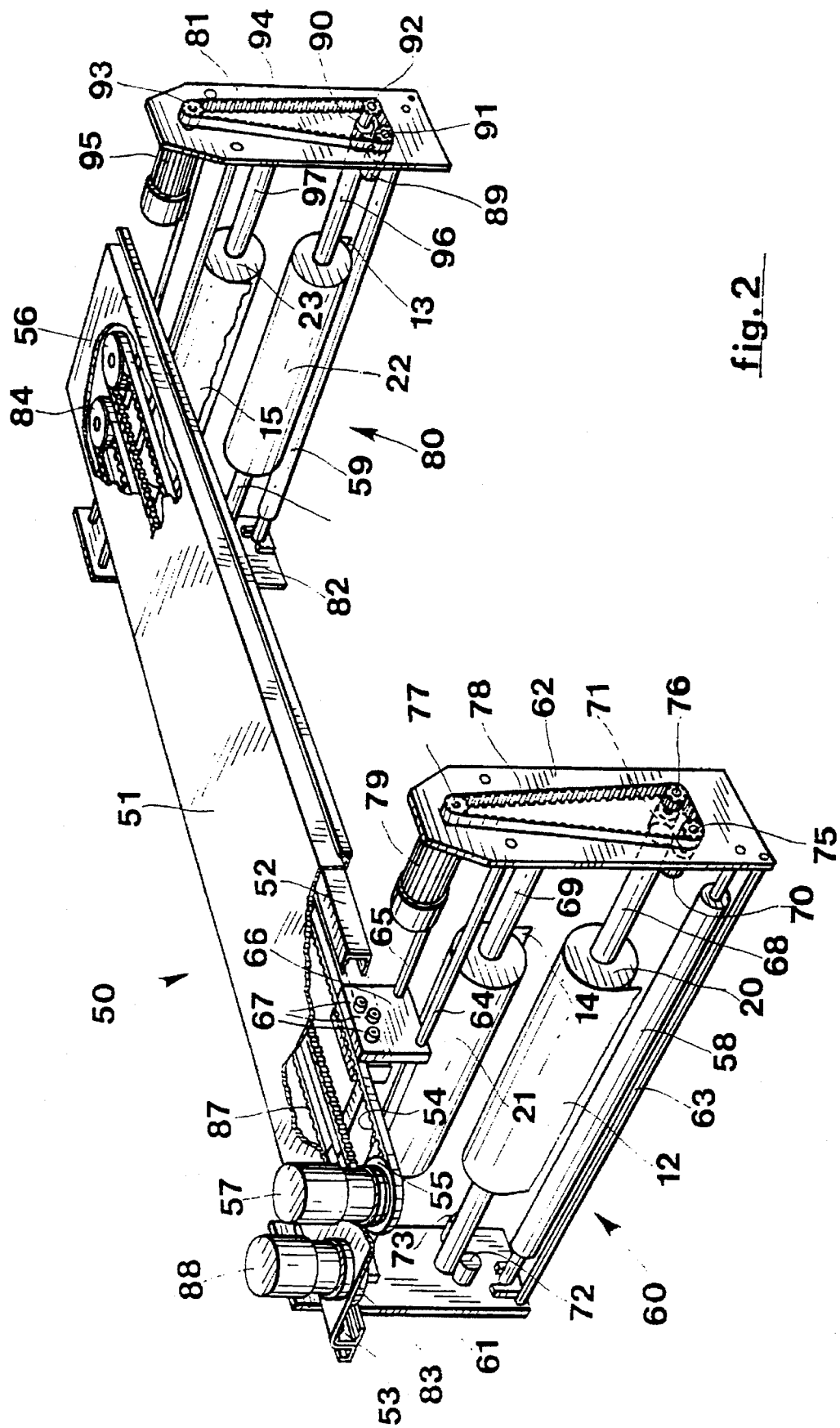
FIG. 2 Perspective view of the feed unit
Figure 3:
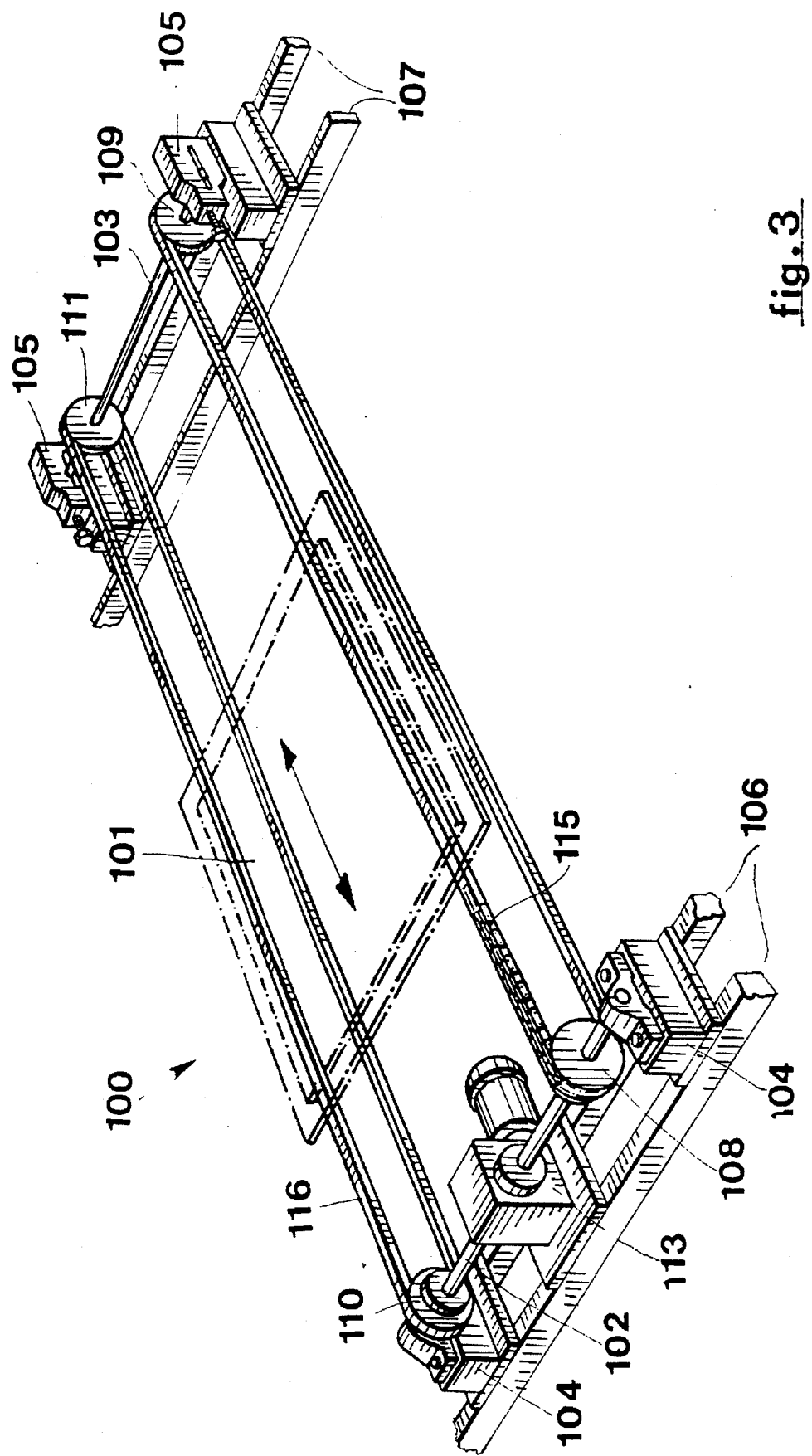
FIG. 3 Perspective view of the work tables horizontal translation unit.

The machine 10 executes automatic assembly, step by step, of a pile 45 of packages 38–39 for plastic laminates composed of two copper bands 12, 13, of two bands of insulating material 14, 15, of intermediate steel sheets 30–32 and of sets 35–37 of sheets of prepreg.

Said machine has a cage-type parallelepiped structure 11 and includes the following main mechanical devices.

A unit 50 for feeding in bands of copper and of insulating material, placed on the upper level 19 of the structure 11.

A unit 100 for horizontal translation of the work table 101 on which the pile 45 of packages of plastic laminates is formed, said unit being situated on the lower discharge level 17 of the machine.

A unit 120 for hoisting the work table, placed on the base level 16.

A unit 140 for pressing the components of the pile of packages being formed, fixed at the upper level 19. The feed unit 50 comprises a flat oblong laminar shaped body 51, placed at an upper level, that supports the guides 52, 53 in which slide the feed carriages 60, 80 respectively, said carriages being substantially the same.

The carriage 60 consists of two sides 61, 62 connected by the cross pieces 63–65.

The upper cross bars 64, 65 are held substantially midway along the slide 66 which moves in relation to the guide 52 by means of the rollers 67.

Said slide is pulled along by the continuous toothed belt 54 between the toothed wheel 55, fixed to the shaft of the ratiomotor 57 mounted at one end of the oblong body 51, and the freely turning wheel 56 at the other end of said body 51.

The sides 61, 62 of said carriage 60 support the shaft 68 of the reel 20 carrying the copper band 12 and the shaft 69 of the reel 21 carrying the insulating band 14. The two ends of the shaft 68 rest on the pairs of pins respectively 70, 71 and 72, 73.

The pins 70, 71 are respectively fixed to the pinions 75, 76 connected by the continuous toothed belt 78 to the pinion 77 fixed to the shaft of the electric ratio-motor 79 mounted on the side 62 of the carriage 60. The carriage 80, with sides 81, 82, is hung on a slide 86, similar to the slide 66 of the carriage 60, already described, which moves along the guide 53 laid between the wheels 83, 84 and is pulled by the continuous toothed belt 87 operated by the electric ratio motor 88. Said carriage 80 supports the shaft 96 of the reel 22 carrying the copper band 13 and the shaft 97 of the reel 23 carrying the insulating band 15.

The shaft 96 is put into motion by the pins 89, 90 fixed to pinions 91, 92 pulled, by the continuous belt 94, by the pinion 93 mounted on the shaft of the electric ratio motor 95.

The unit 100 that horizontally translates the work table 101 comprises the shafts 102, 103 that turn in the supports 104, 105 fixed at the two ends of the machine on the pairs of cross bars 106, 107 of the structure 11. At one end of said shafts 102, 103 are fixed the toothed wheels 108, 109 that carry the continuous chain 115, and, at the other end, the toothed wheels 110, 111 that carry the continuous chain 116.

The shaft 102 is drawn by the ratiomotor 113. The hoisting unit 20 for the work table 101 comprises the hoisting means 121 which in turn comprises the plate 128 at the base fixed to the structure 11 of the machine by means of the cross bars 122.

Said base plate 128 is connected to an upper plate 130 by four columns 125 to which are screwed the nuts 126, and carries in the centre a ratio motor 123 that works the vertical worm screw 124 turning in the bushing 127 of the upper plate 130.

Between said base plate 128 and the upper plate 130 is a rectangular plate 131 in whose centre is a lead 122 in which the worm screw turns.

Under said intermediate plate 131 are fixed four guide bushings 132 which slide round the above columns 125, and above it are the four columns 133 on which the work table 101 rests.

Therefore, by starting up the ratiomotor 123, the intermediate plate 131 moves vertically taking with it, by means of the columns 133, the work table 101.

The presser unit 140 comprises the oblong laminar body 141 shaped like a wide C fixed above the oblong body 51 in the feed unit 50.

Close to the edges of said oblong body 141 the two upward-facing guides 142, 143 are fixed, on each respective side of which are the racks 144, 145.

The pressers 150, 151 slide on roller bearings 146, 147 in the guides 142, 143, said pressers being frame-shaped and composed of two upper bars 152, 163 carrying at their ends the pairs of columns 154–155 and 156–157.

Sliding inside said columns are the rods 158, 159 whose lower ends support the flat horizontal bars 160, 161 to which are fixed the laminal strips 162, 163 these latter being moderately elastic.

At their upper ends said rods 158, 159 are fixed to the pistons of master cylinders 164, 165 fixed to the bars 152, 153.

Mounted on said bars are the ratiomotors 166, 167 to whose shafts are fixed the pinions 168, 169 that engage with the racks 144, 145 referred to above.

By turning on said ratio motors 166, 167 and the master cylinders 164, 165, the pressers 150, 151 can be moved horizontally and vertically as required.

Figure 6:
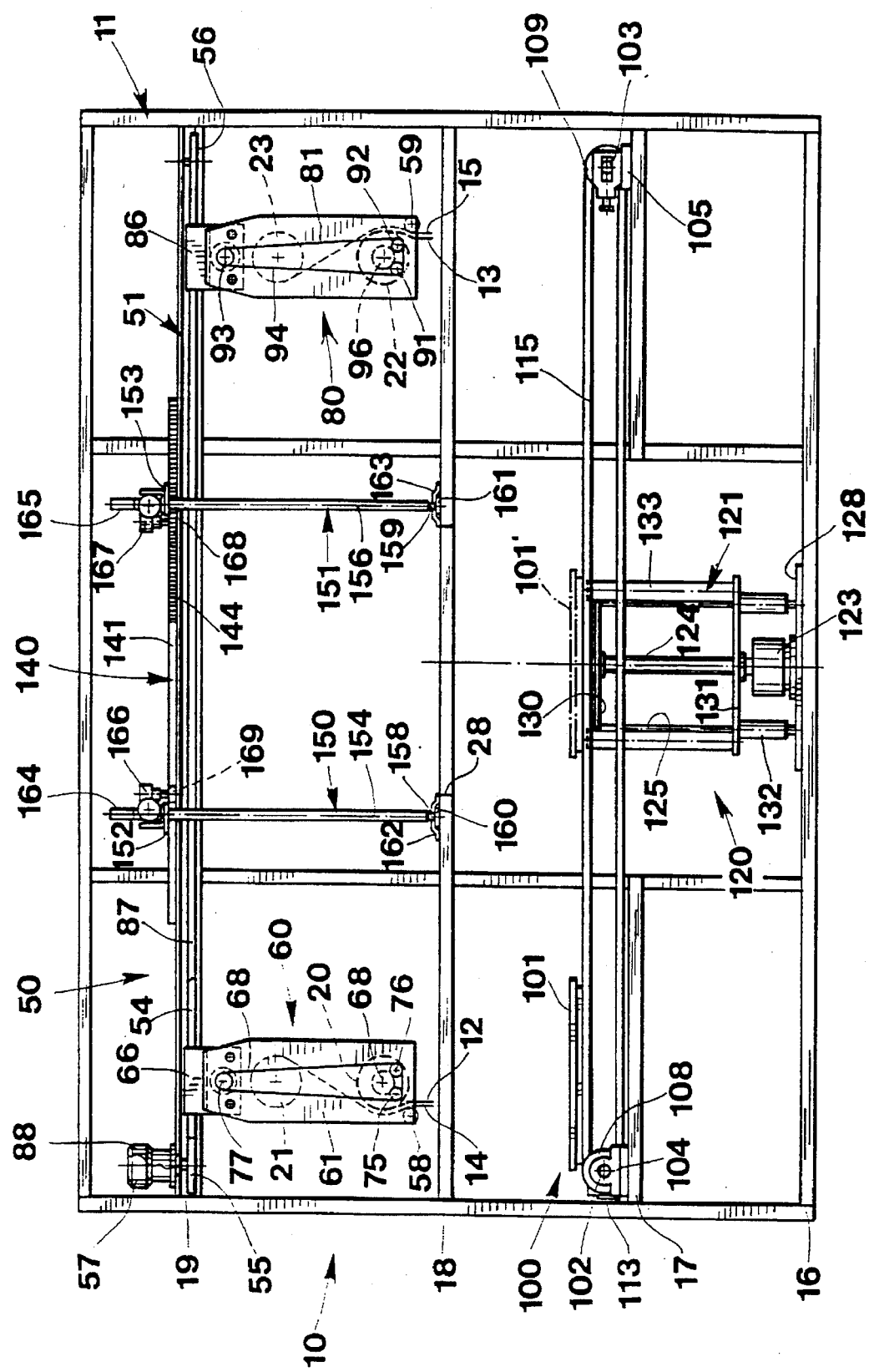
FIG. 6 The assembly machine at the start of the work sequence.

At the start of the work sequence (FIG. 6) the work table 101 is on the left at the discharge level 17, a pile of packages for plastic laminates assembled by the machine 10, having been taken of the table in that position in the preceding work sequence.

The feeder carriages 60, 80 providing copper bands 12, 13 and insulating bands 14, 15 respectively from the reels 20, 21 and 22, 23, are in position at the longitudinal ends of the machine.

The work table 101 is drawn along by the chains 115, 116 worked by the ratiomotor 113, to the position 101' in vertical alignment with the hoisting unit 121 and with the aperture 28 in the work surface 18.

Figure 7:
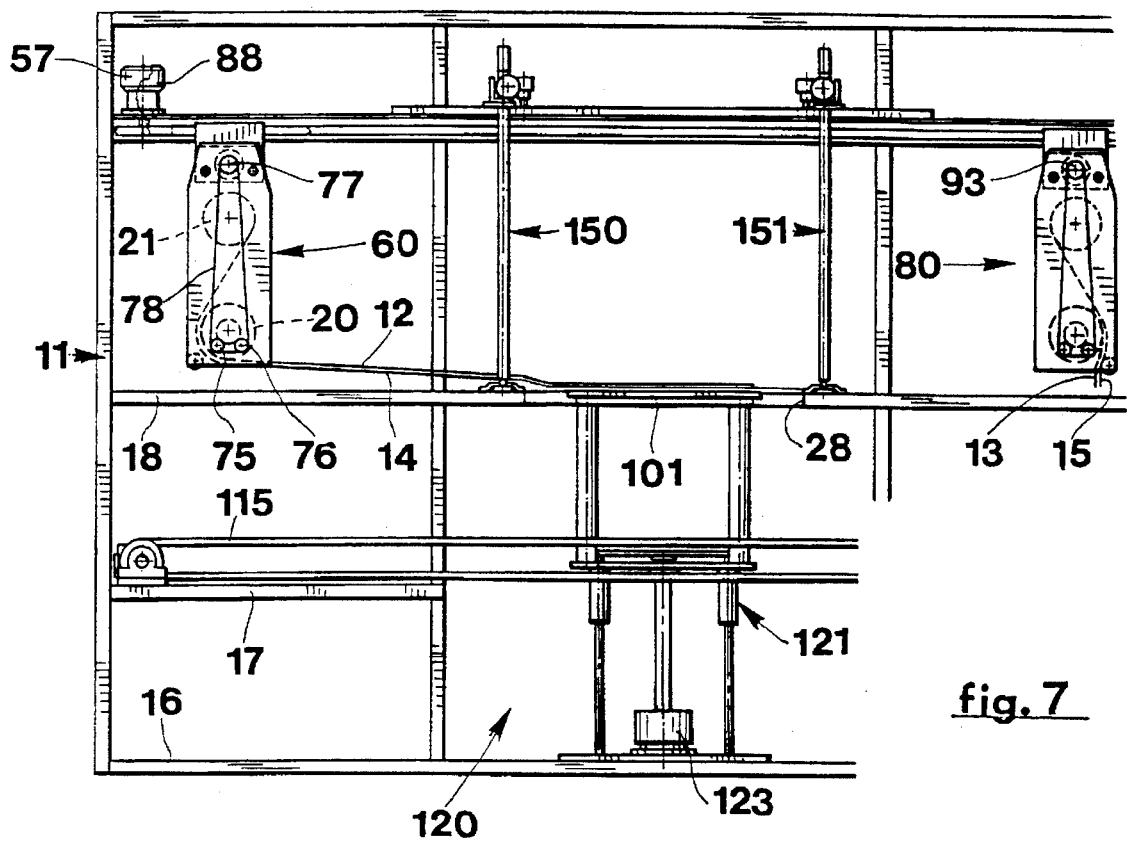
FIG. 7 Laying of the ends of the pairs of copper bands and insulating bands making up the plastic laminates, fed in from a carriage placed at the first end of the machine, on the work table.

Said hoister 121, worked by the ratio motor 123 carries the work table 101 onto the geometrical plane of the work surface 18, inside the aperture 28 (FIG. 7).

Subsequently the ends of the copper band 12 and of the insulating band 14 are laid on said work table 101, said ends being fed in from the first carriage 60 operated by the ratiomotor 79.

Figure 8:
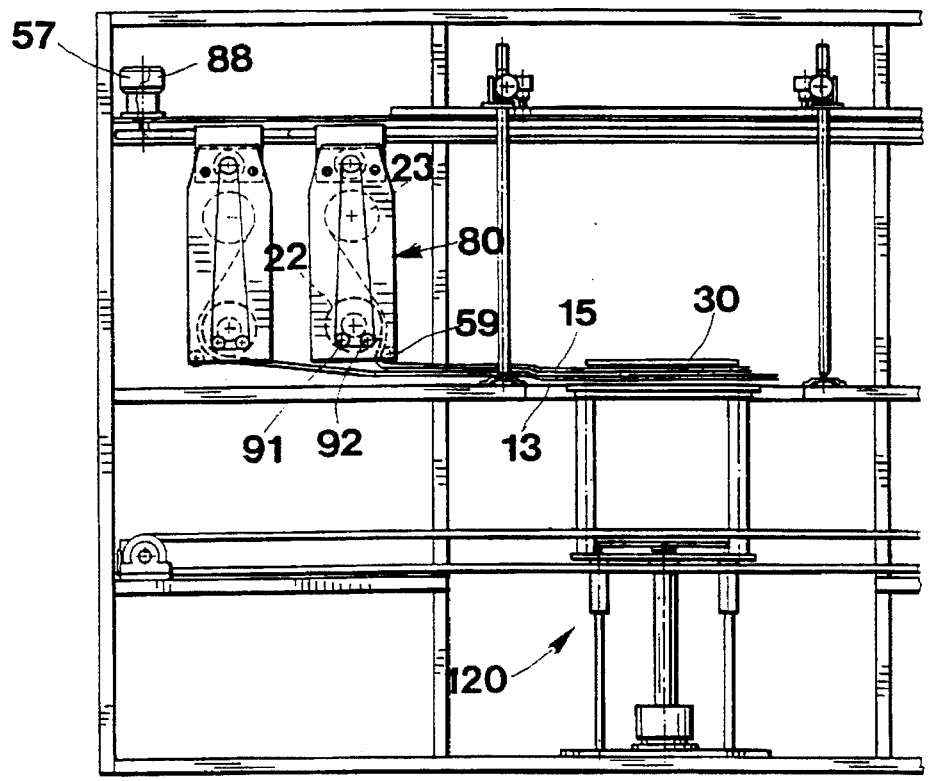
FIG. 8 Laying on the work table of the pairs of copper bands and insulating bands fed in from a second carriage, and laying of a steel sheet.

The carriage 80 moves to the left hand end of the machine and the ends of the second copper band 13 and of the second insulating band 15 are placed, fed in by the second carriage 80 operated by the ratiomotor 95, guided by the idle roller 59, the intermediate sheet 30 being then laid on (FIG. 8).

The ratiomotor 79 works the pinion 77 and this, by means of the toothed belt 78, causes rotation of pinions 75, 76 to which the pins 70, 71 are fixed and on which pins rests the shaft 68 of the reel 20 carrying the copper band 12 drawn along in the rotating movement.

The insulating band 14, fed in by the reel 21, in practice is drawn along by friction against the copper band 12. Similarly the ratiomotor 95 pays out the copper band 13 from the reel 22 and the insulating band 11 from the reel 23. The hoisting means 120 lowers the work table 101 so that the upper surface of the intermediate sheet 30 is flush with the work surface 18.

Figure 9:
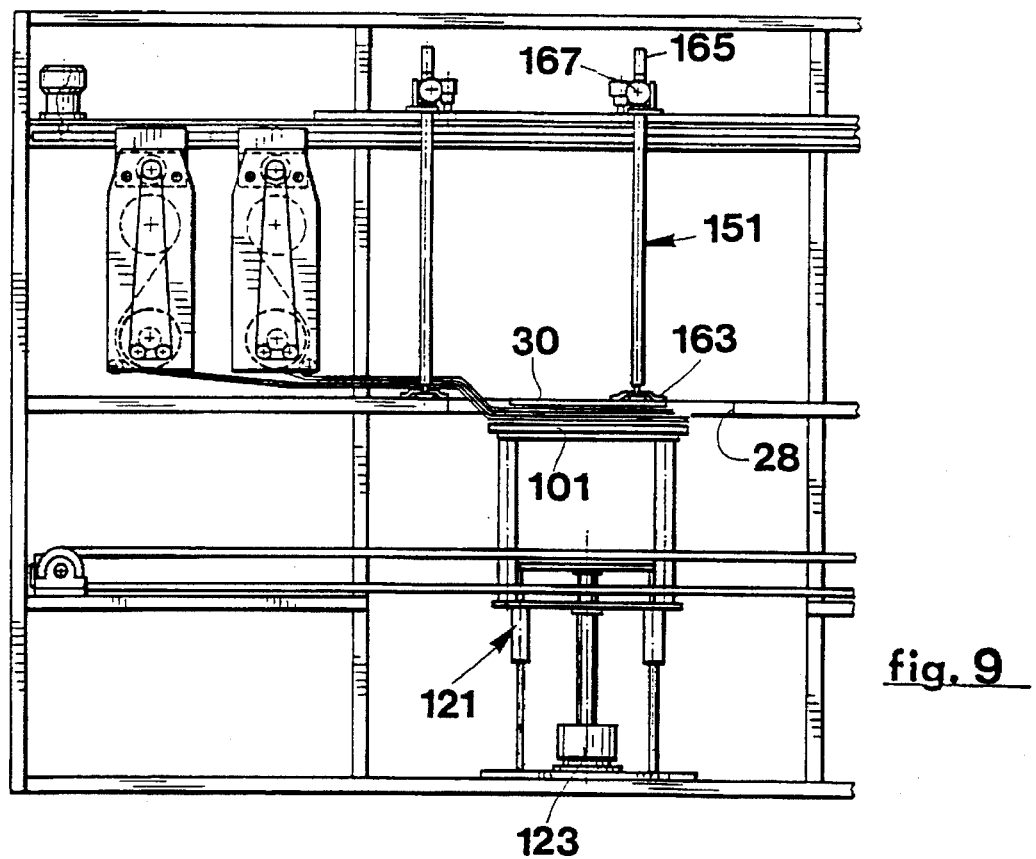
FIG. 9 Movement of a presser onto the pile of packages being formed.
Figure 10:
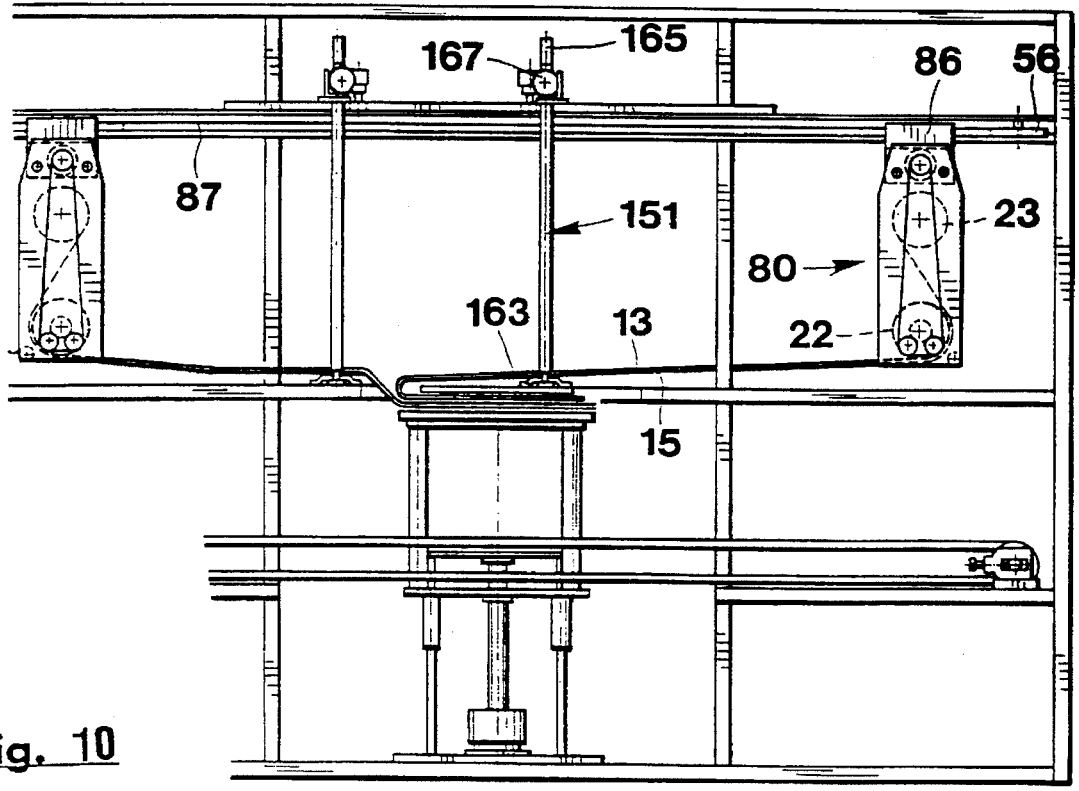
FIG. 10 Movement of the second feed carriage on the second end of the machine.

Due to vertical movement by the cylinders 165 and horizontal movement worked by the ratiomotor 167, the second presser 151 moves onto the intermediate sheet 30 (FIG. 9) holding it firm to assist action by the elastic lamina 163. The second feeder carriage 80 moves to the right hand side of the machine provoking the 180° bend of the copper and insulating bands on the upper surface of the sheet 30 (FIG. 10).

Figure 11:
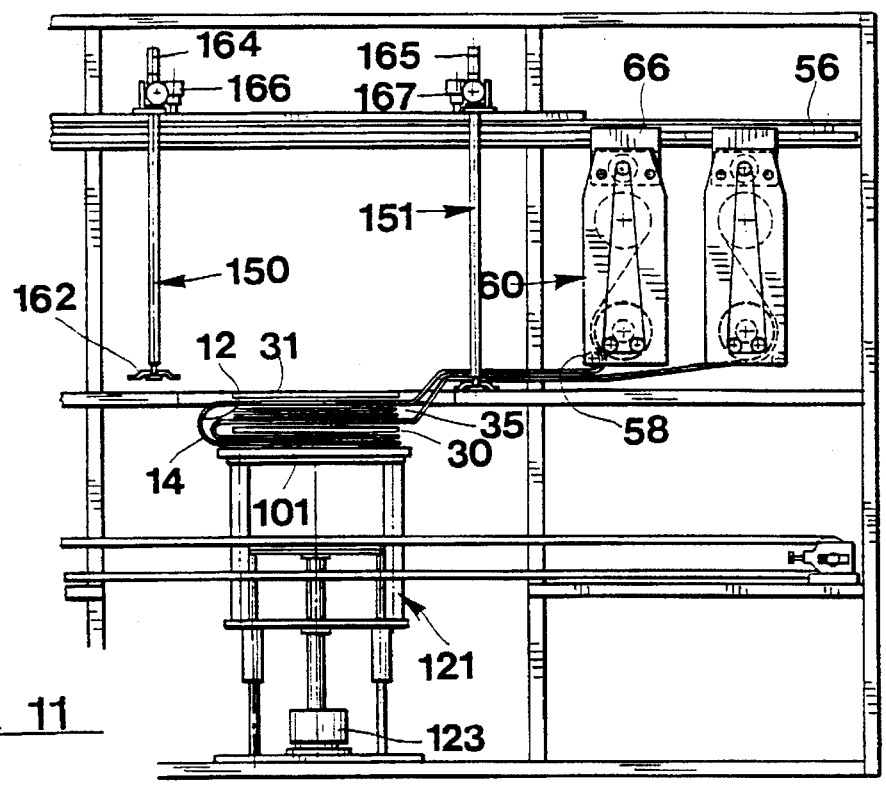
FIG. 11 Completion of a first package for plastic laminates; laying of a second steel sheet.

A first set of sheets of prepreg 35 are laid on (FIG. 11). The first carriage 60 also moves to the right of the machine causing the second copper band 12 and the second insulating band 14 to make a 180° bend, guided by the idle roller 58 of said carriage.

Figure 12:
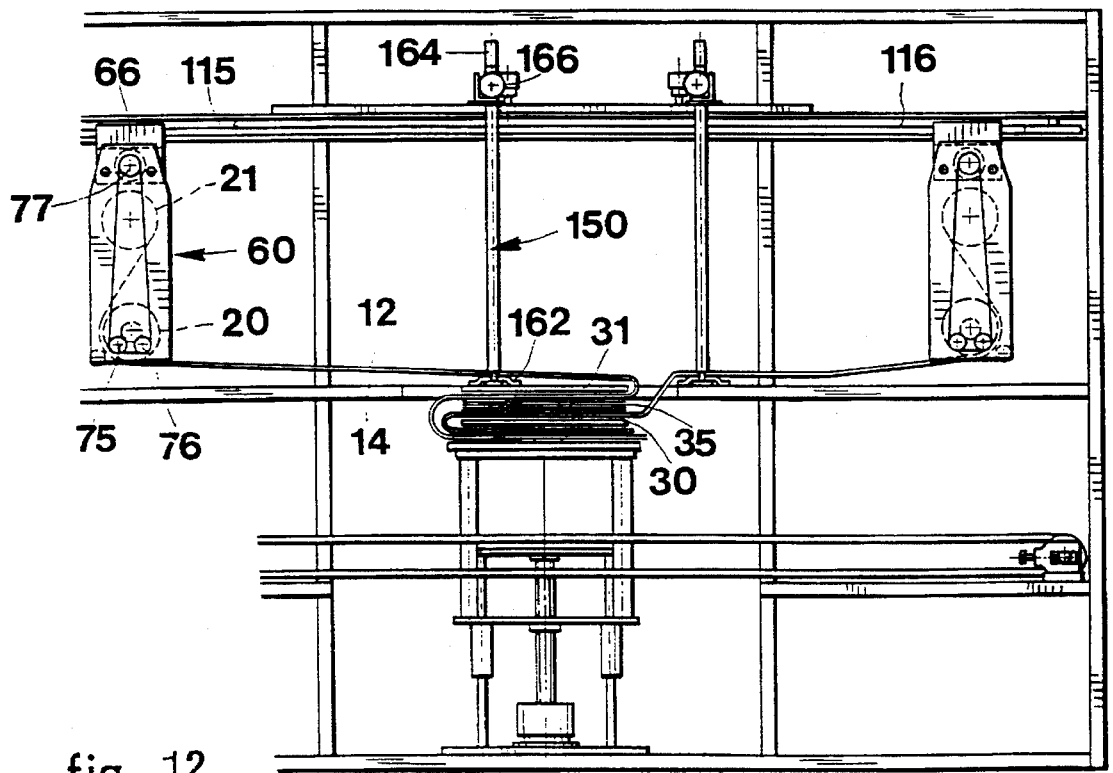
FIG. 12 Movement of a presser onto the second steel sheet, return of the first feed carriage to the first end of the machine.

The second intermediate sheet 31 is then laid while the first presser 150 is raised by the cylinders 164 for transfer, by means of the ratio motor 166, onto said intermediate sheet 31 to hold it firm (FIG. 12).

Figure 13:
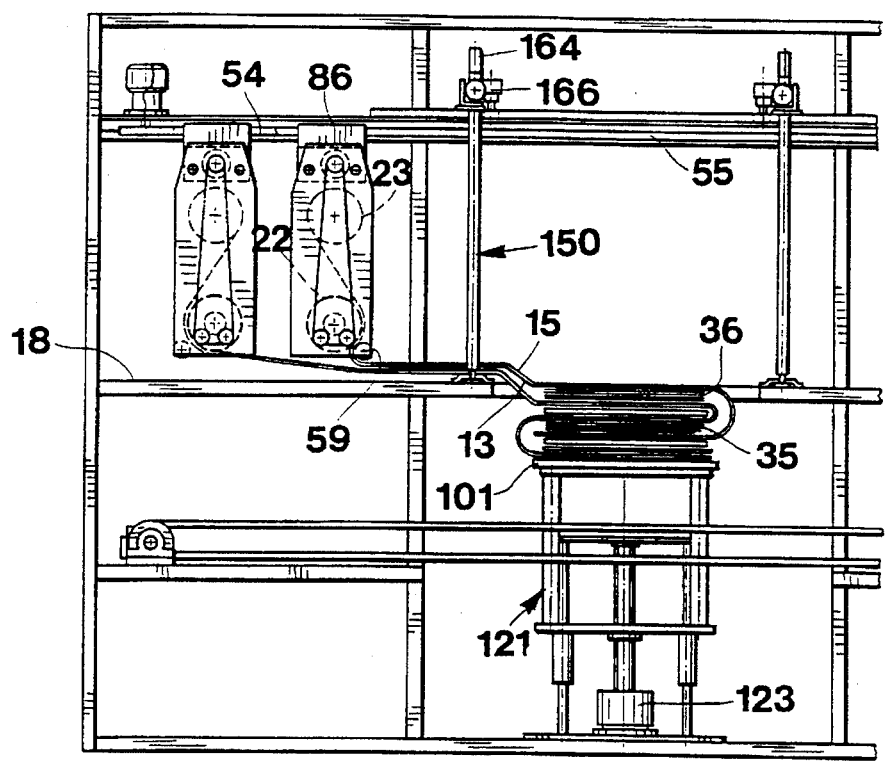
FIG. 13 Completion of a second package for plastic laminates.
Figure 14:
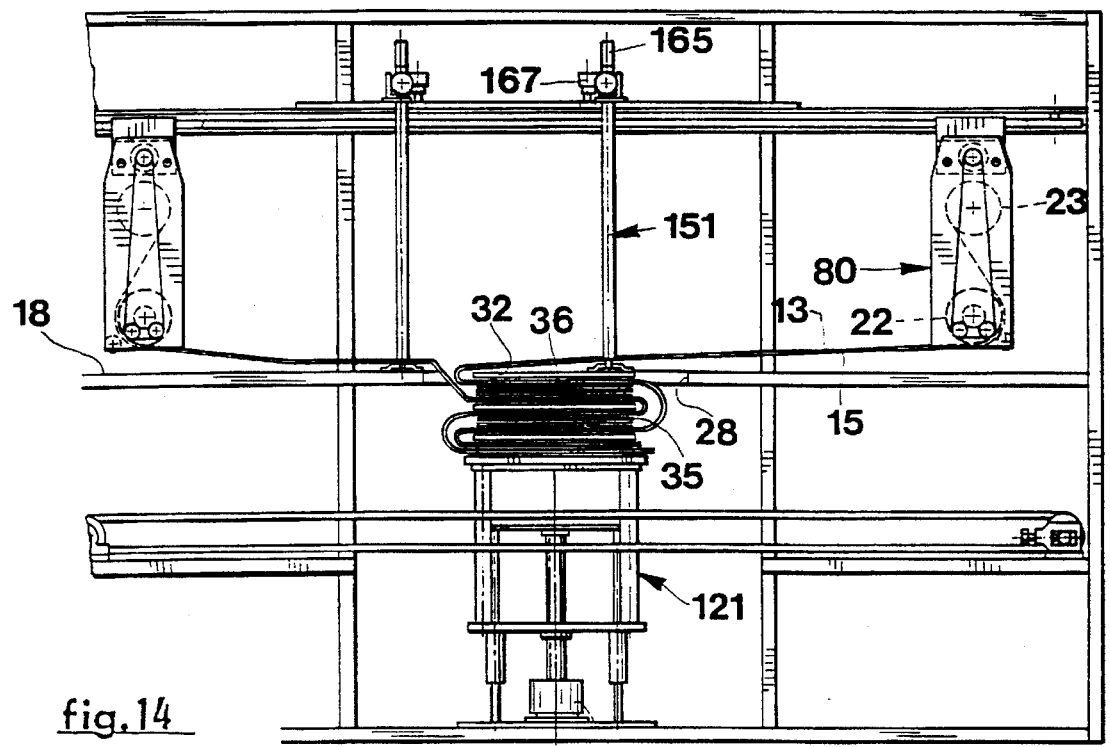
FIG. 14 Laying of a third steel sheet; completion of a pile of two packages.
Figure 15:
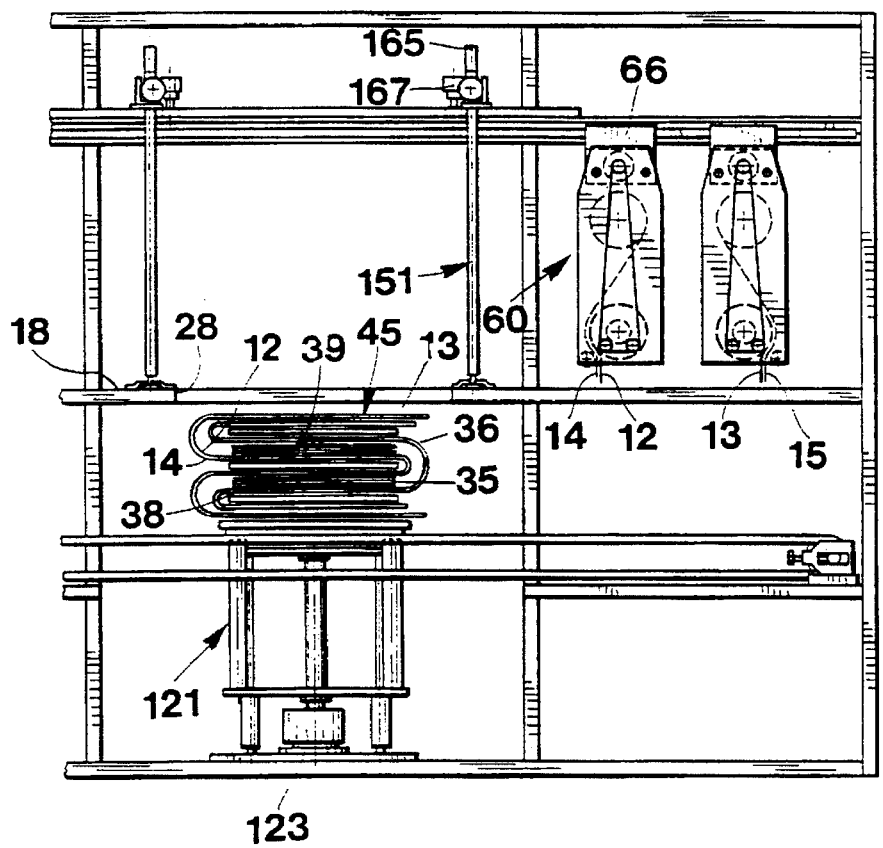
FIG. 15 Lowering of the work table beneath the work surface.

The first carriage 60 returns to the left of the machine determining the second 180° bend by the first copper band 12 and by the first insulating band 14 around the intermediate sheet 31 held down by the presser 150 (FIG. 12). A second set 36 of prepreg sheets is laid on, the hoisting device 121 further lowers the work table 101, after which the second feed carriage 80 again moves to the left of the machine determining a second 180° bend made by the second copper band 13 and second insulating band 15 (FIG. 13). The third intermediate sheet 32 is laid on. The second presser 151 is placed on said sheet to hold it down. The second carriage 80 returns to the right of the machine causing the second copper band 13 and second insulating band 15 to make a bend of 180° (FIG. 14).

The first carriage 60 also moves to the right of the machine causing the first copper band 12 and first insulating band 14 to make a 180° bend thus bringing the two copper bands 12 and 13 into contact.

The serpentinewise arrangement of copper and insulating bands can obviously continue and other packages in the pile 45 be so formed.

Figure 5:
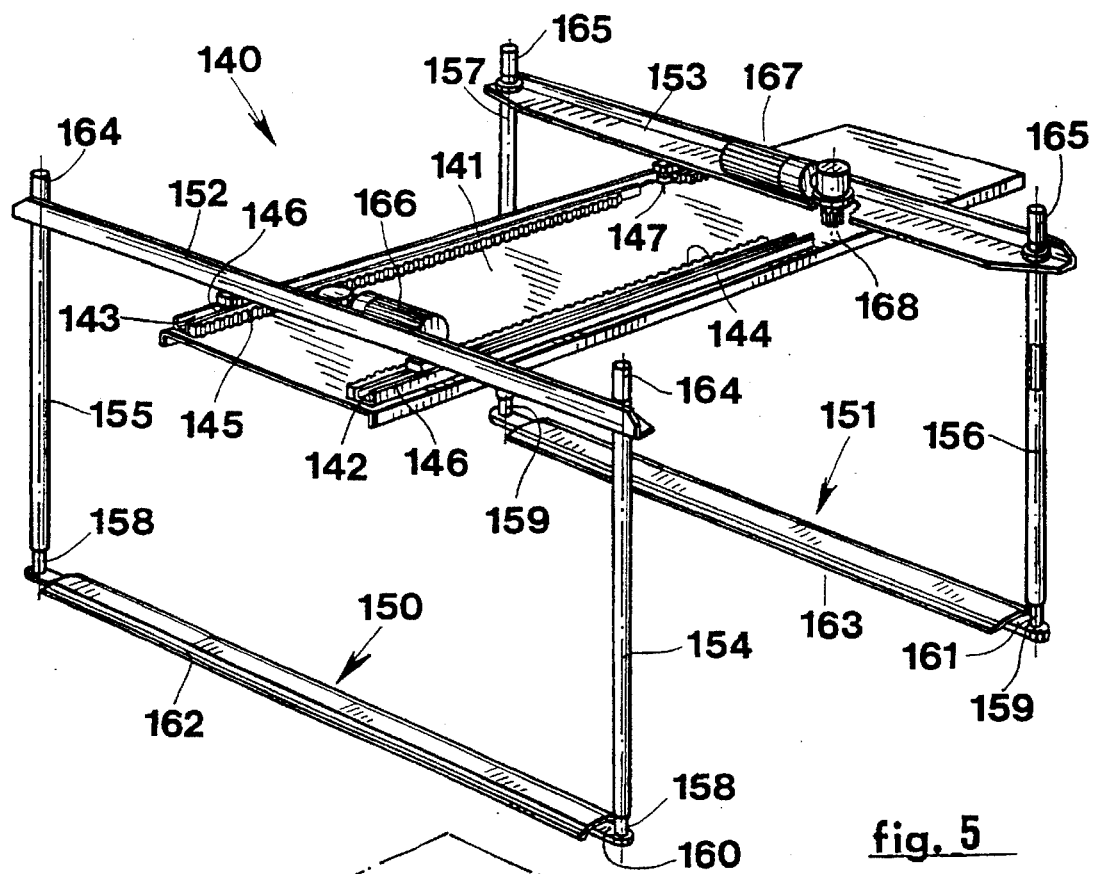
FIG. 5 Perspective view of the stabilizing unit.
Figure 4:
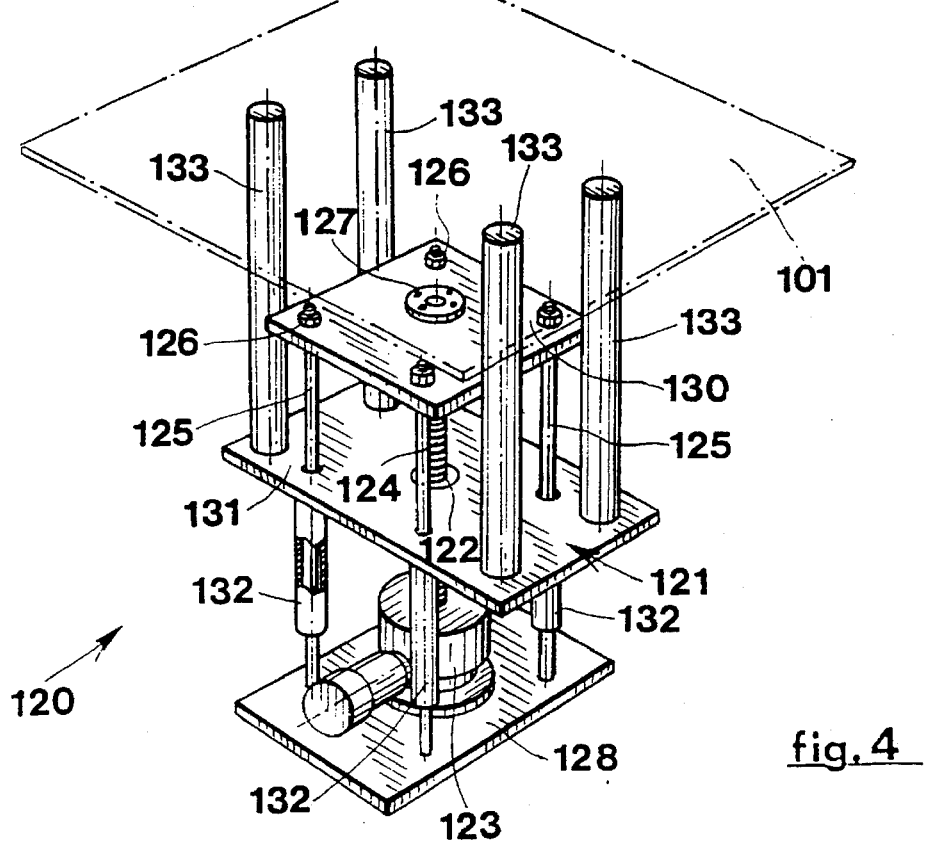
FIG. 4 Perspective view of the work table hoisting unit.

In FIG. 5 construction of the pile 45 is stopped at two packages 38, 39.

Figure 16:
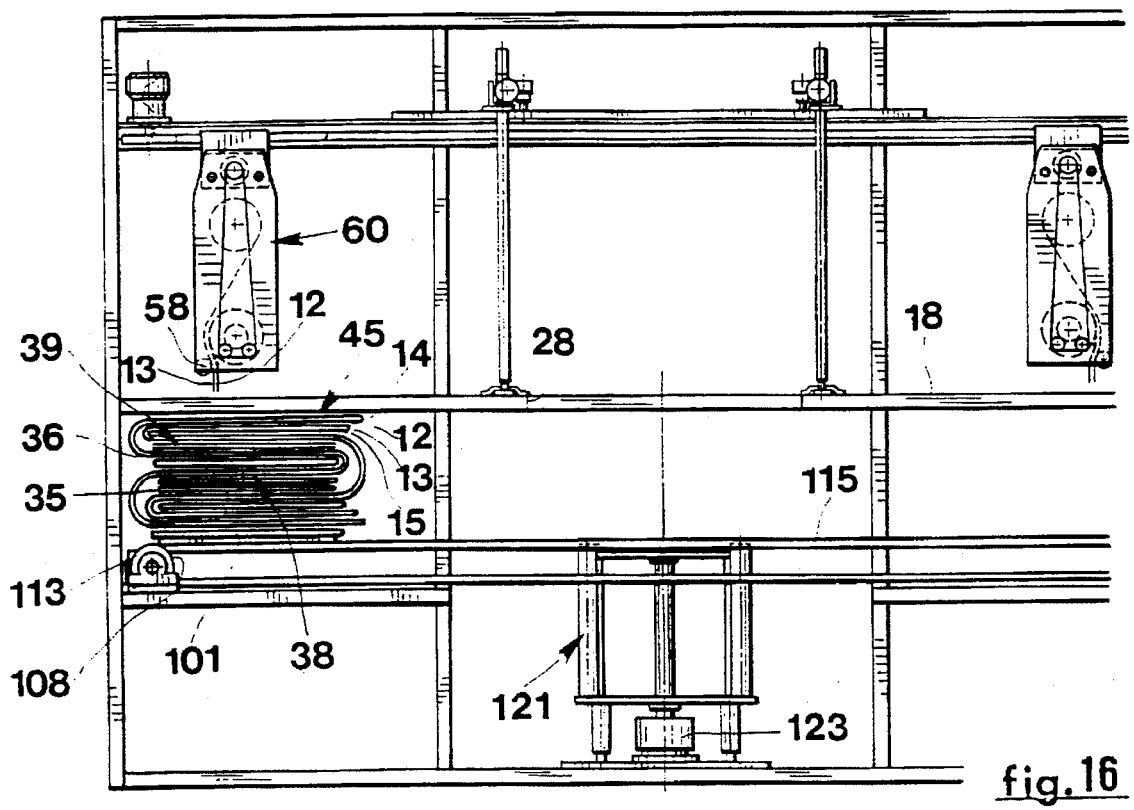
FIG. 16 Movement of the work table to the first end of the machine for discharge of the assembled pile of packages.
Figure 17:
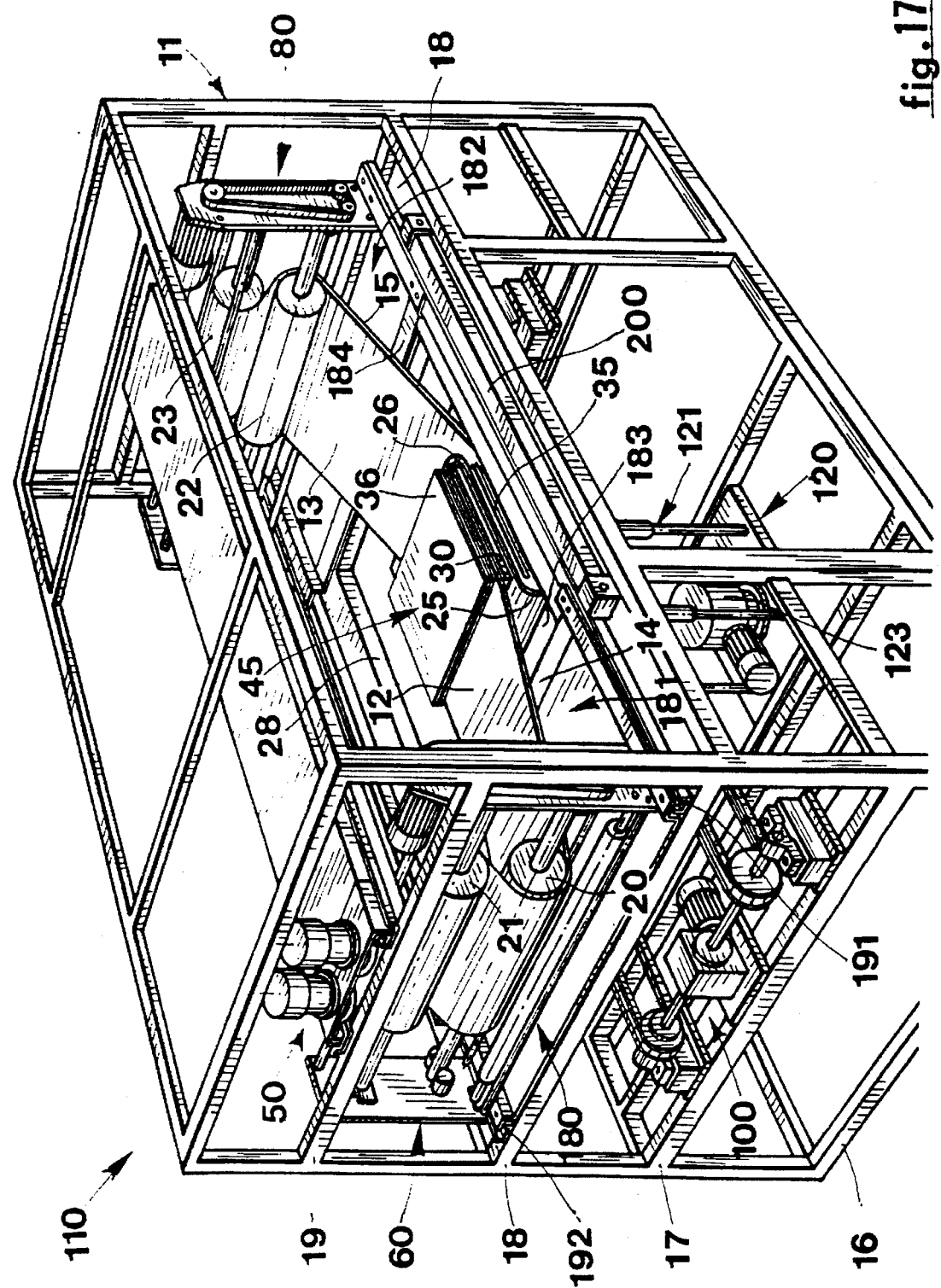
FIG. 17 Perspective view of a variation of the assembly machine in FIG. 1 showing the stabilizing unit with two horizontally-translating blades.

The bands are cut and the hoisting device lowers the work table 101 to the level of the chains 115, 116 in the horizontal translation unit 100 (FIG. 16).

Said translation unit returns the work table 101 to the left hand side of the machine with the completed pile 45 which can therefore be collected and used. FIGS. 17–22 show a different version 110 of the machine 10 consisting of replacement of the stabilizing unit 140 by a stabilizing unit 180 having two horizontal blades.

Said unit 180 comprises the longitudinal lateral C-shaped guides 190, 191 facing upwards.

The rectangular blades 181, 182 slide, by means of roller bearings, like 192–197, along said guides situated on the work surface 18.

The sides 185, 186 of said blades are raised and the opposing sharpened edges, respectively 183 and 184, face towards the aperture 28 in the work surface 18.

Said blades are operated by the master cylinders 200, 201 alongside the guides 190, 191, respectively, by means of the arms 202, 203.

Figure 18:
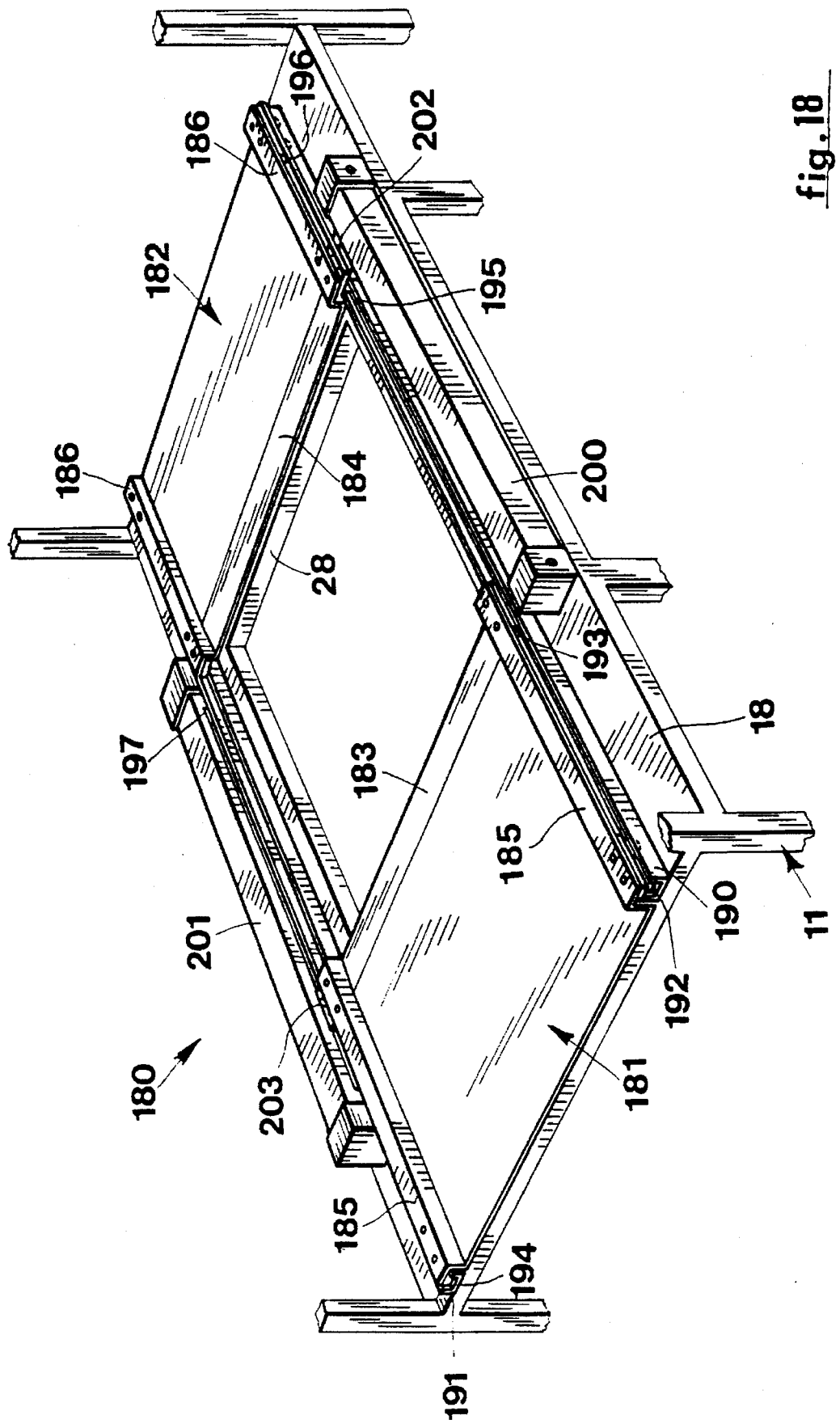
FIG. 18 Perspective view of the double-blade stabilizing unit.
Figure 19:
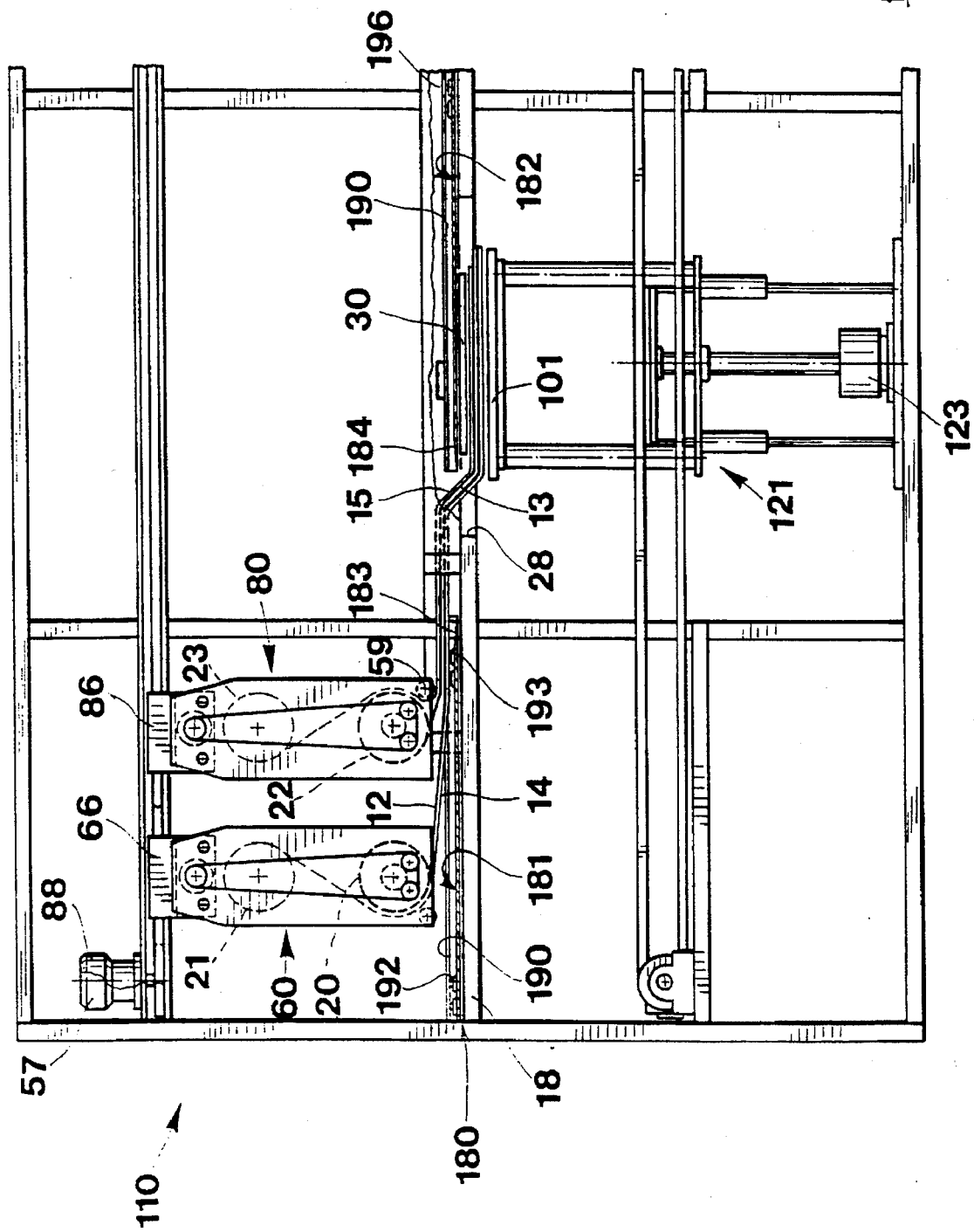
Figure 20:
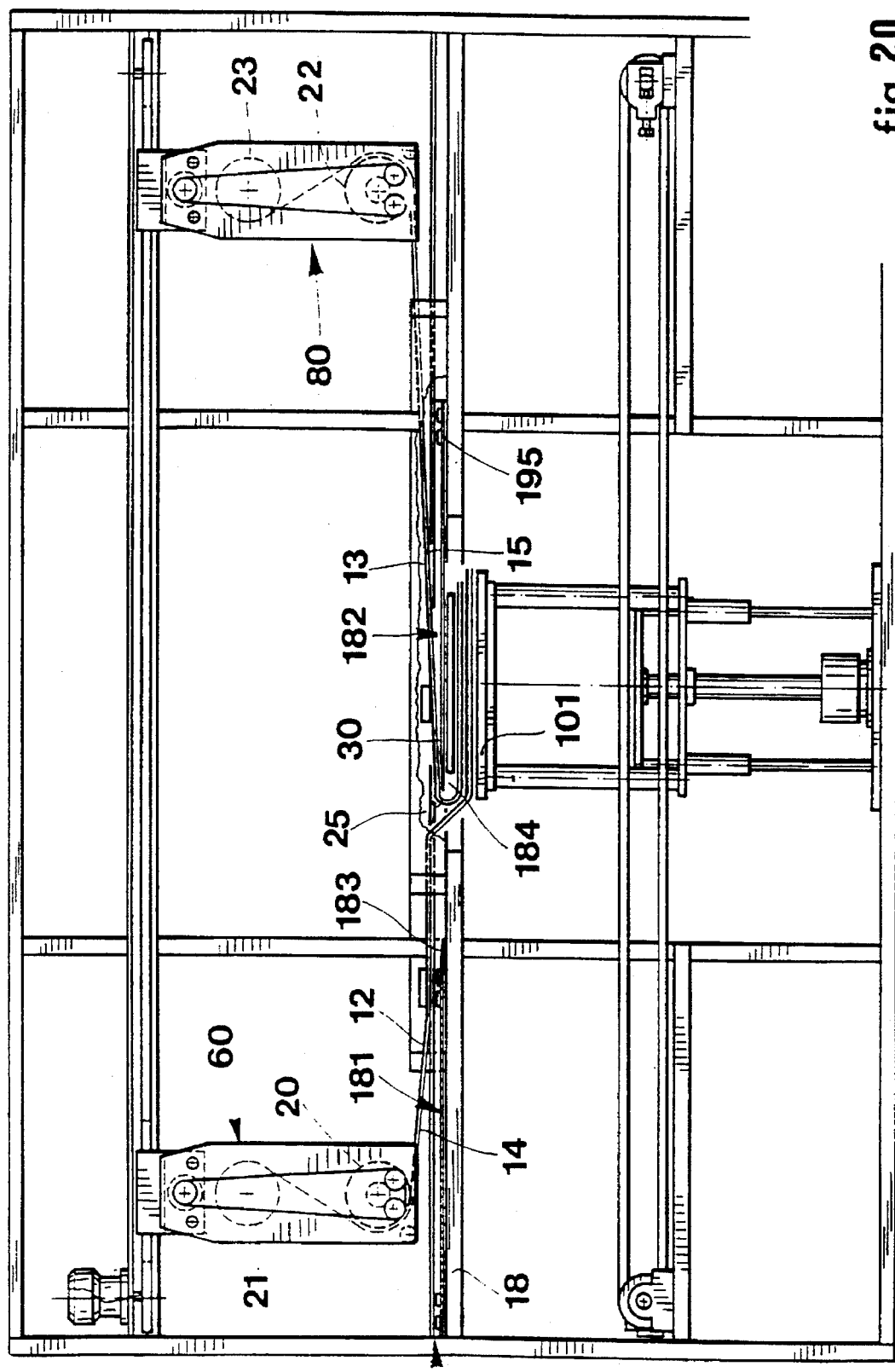

In their idle positions said blades lie as seen in FIG. 18, one on each side of the aperture 28 in the work surface 18, said aperture allowing passage of work table 101. When adequately operated, the master cylinders 200, 201 transfer the blades alternately to the aperture 28. The work of these blades is substantially that done by the pressers 150, 151 in the stabilizing unit 140, their function being that of holding firm the components of the pile of packages, for making plastic laminates, while in the process of formation, and they therefore operate in the stages seen in FIGS. 19–22 which correspond to those already illustrated in FIGS. 9–12.

After the intermediate sheet 30 (FIG. 19) has been laid, the blade 182 is moved to the position of the aperture 28, above said sheet 30.

Consequently, when the carriage 80 is moved to the right hand side of the machine (FIG. 20) the edge 184 of said blade 182 facilitates, and permits, the bend 25 made at 180° by the pair of bands 13 and 15. Having accomplished this, the blade 184 returns to its idle position in FIG. 18.

Figure 21:
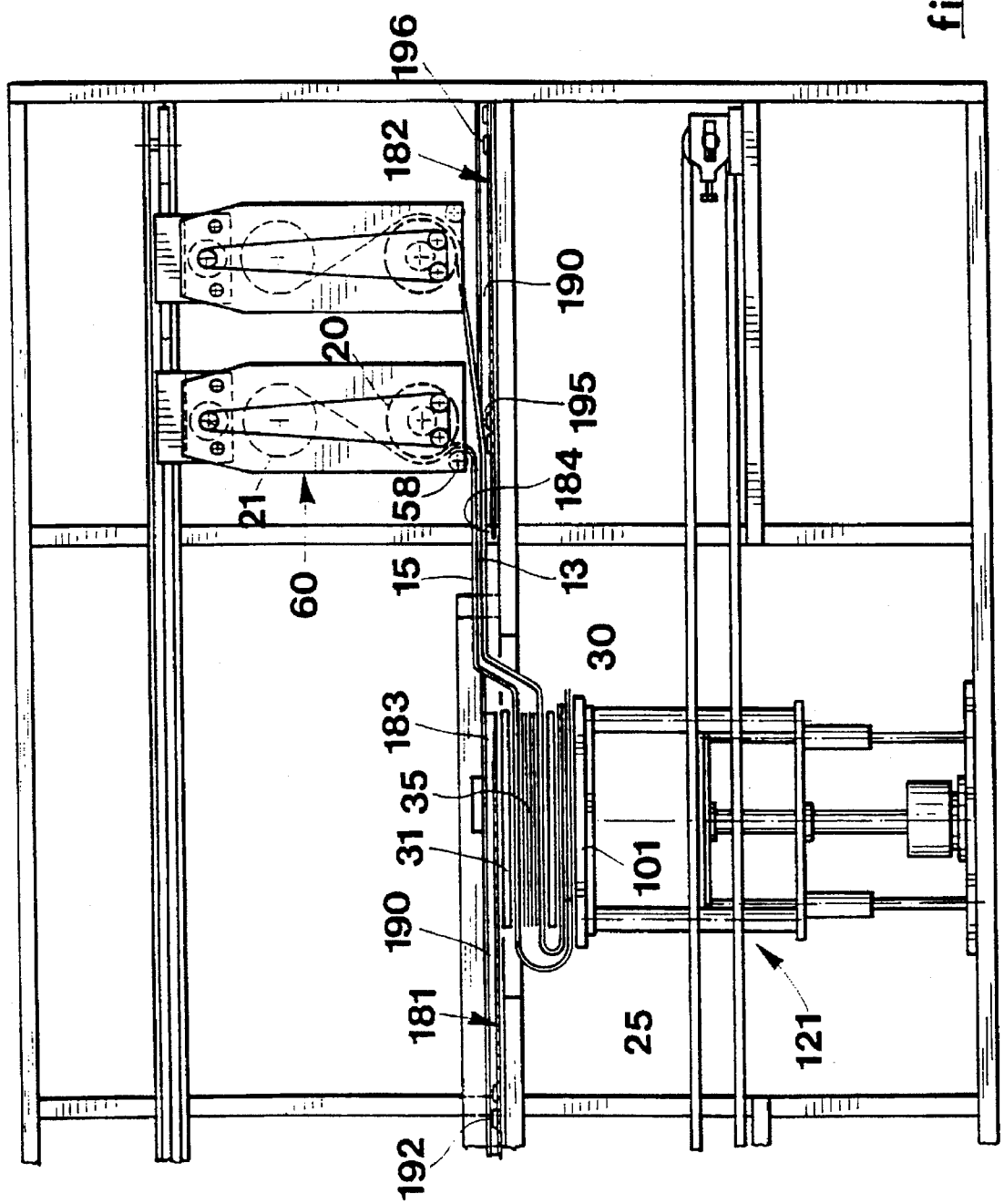

After the intermediate sheet 31 has been laid, it is the blade 181 which moves into position by the aperture 28 of the above sheet 31 (FIG. 21).

Therefore, when the carriage 60 returns to the left side of the machine (FIG. 22), the edge 183 of said blade 181 facilitates, and permits, the bend 26 to be made at 180° by the pair of bands 12 and 14.

Having completed its task the blade 181 returns to its idle position, as seen in FIG. 18.

Formation of the pile of packages continues as illustrated in the preceding FIGS. 13–16.

I claim:

1. Automatic machine (10, 110) for assembling piles (45) to packages (38, 39) to make plastic laminates with metal laminae made from metal bands (12, 13) laid serpentinewise between one set and another (35, 36) of sheets of prepreg and flat intermediate sheets (30–32) between the packages (38, 39) characterized in that it comprises an oblong longitudinal horizontal work surface (18) in which there is a central rectangular aperture (28) to receive a work table (101) on which a pile of packages (45) is formed, a feed unit (50) that feeds out metal bands (12, 13) with one or more carriages (60, 80) each carrying at least one reel (20, 22) of metal band and translating on parallel longitudinal guides (52, 53) from one side of the work table (101) to the other, a unit (120) for supporting and hoisting the work table (101), a unit (140, 180) for stabilizing the pile of packages for laminates by means of two devices (150, 151) (181, 182) to hold the packages, translatable as required along longitudinal guides (142, 143) (190, 191) from idle positions one on each side of the work table (101) to the position of the pile

(45) of packages being formed in order to hold said growing pile (45) on the work table (101) at a stage in the working sequence, and an electronic drive unit to program the working sequence and to synchronise the various movements so that by causing the carriages (60, 80) to translate back and forth from one side of the work table (101) to the other and by placing on said work table (101) at the start of each work sequence an end of one or more metal bands (12, 13), placing on said ends, after each alternatingly moving stroke of said carriages (60, 80), a set of sheets of prepreg (35, 36) and intermediate sheets (30, 32), said pile (45) of packages is progressively formed with the metal bands (12, 13) laid serpentinewise, forming 180° bends in one direction and in the other between one package (38, 39) and the next while, operating the hoisting unit (120), the work table (101) is gradually lowered during formation of the pile (45) to keep its upper surface practically flush with the work surface (18), the device (150, 151,) (181, 182) of the stabilizing unit (140), (180), placed at the side of the work table (101) opposite to that towards which the bands (12–15) are oriented, then moving onto the growing pile (45) holding it firm while the carriages (60, 80) move towards said side of the work surface (18) to facilitate formation on said bands (12–15) of the 180° bends to be made in one direction and then in the next.

2. Automatic assembly machine (10, 110) as in claim 1, characterized in that on each carriage (60, 80) a reel (21, 23) of insulating band is associated to the reel (20, 22) of metal band so that the serpentine of bands winding between one package (38, 39) and the next, has the insulating bands (14, 15) matching with the intermediate sheets (30–32) and the metal bands (12, 13) matching with the sets (35, 36) of sheets of prepreg.

3. Automatic assembly machine (10, 110) as in claim 1, characterized in that on each carriage (60, 80) a reel of insulating band (21, 23) is associated to the reel (20, 22) of metal band and in that there are two reel-carrying carriages (60, 80) in such a way that by beginning the working sequence with the two carriages (60, 80) at one side of the work table (101) and laying upon said table, in the following order, the associated ends of an insulating band (14) and of a metal band (12), the associated ends of the second metal band (13) and of the second insulating band (15) causing the two carriages (60, 80) to move alternately from one side of the work table (101) to the other and placing on the growing pile (45) at each stroke of the carriage (60, 80) and therefore at each 180° bend made by the bands, alternatively an intermediate sheet (30–32) and a set (35, 36) of sheets of prepreg, the pile (45) of packages will be gradually formed.

4. Automatic assembly machine (10, 110) as in claim 1, characterized in that the carriages (60, 80) in the feed unit (50) each carry two reels, a lower one (20, 22) of metal band (12, 13) and an upper reel (21, 23) of insulating band (14, 15) their axes being parallel and orthogonal to the direction of movement of the carriages (60, 80) the two reels on each carriage being wound in opposite directions, the insulating band (14, 15) passing round the reel (20, 22) of metal band (12, 13), an idling roller (58, 59) being placed on the lower end of each carriage (60, 80) parallel to the reels (20–23) on the side opposite the direction of unwinding of the lower reels (20, 22), said lower reels (20, 22) being motor driven by the pulling action of two shafts, in a pair (70, 71) (89, 90) side by side and projecting internally at one side (62, 81) of the carriage (60, 80),on which shafts one end of the shaft (68, 96) of the lower reel (20, 22) rests freely, said shafts (70, 71 (89, 90) being rotated by a continuous chain (78, 94) drawn along by an electric ratiomotor (79, 95) so that by starting up said ratiomotor (79, 95) the reel (20, 22) of metal band pays out said band (12, 13) together with the insulating band (14, 15) drawn along by friction by said band (12, 13).

5. Automatic assembly machine (10, 110) as in claim 1, characterized in that the stabilizing unit (140) comprises a pair of pressers (150, 151) each consisting of a vertical frame transversal to the working surface, comprising an upper bar (152, 153) that supports a lower horizontal bar (160, 161) by means of two vertical rods (158, 159) sliding axially inside two columns (154, 156) fixed to said upper bar (152, 153) operated by master cylinders (164, 165) said frame being suspended to longitudinal guides (142, 143) above the working surface (18) and placed under the control of electric ratiomotors (166, 167) so that by operating said ratio motors (166, 167) and said master cylinders (164, 165) the two pressers (150, 151) can be moved as required from their respective idle positions at the side of the work table (101) to a working position above said table (101) and there generate, also adopting adequate elastic means (162, 163), sufficient pressure on the pile (45) being formed to maintain the various components of the pile (45) in position, especially when the carriages (60, 80) pass from one side of the work table (101) to the other, in order that the bands may make their 180° bend.

6. Automatic assembly machine (10, 110) as in claim 1, characterized in that the stabilizing unit (180) comprises two longitudinal lateral guides (190, 191) for two rectangular horizontal blades (181, 182) that slide as required from an idle position respectively on one side and on the other side of the work table (101) to a position above said work table (101) operated by master cylinders (200, 201) or other motor driving means so that during formation of the pile (45) just as the carriage (60, 80) is about to start its stroke to form a bend of 180° in the bands (12–15), the blade (181) on the opposite side in relation to the work table (101) projects over the growing pile (45) creating with its front edge a reaction against the bands (12–15) that facilitates formation of the 180° bend while at the end of the stroke made by said carriage (60, 80) said blade (181) returns to its idle position and is replaced by the second blade (182) that moves from its idle position onto the pile (45) being formed which, in the meantime, has been lowered to the level of the work surface (18), to facilitate formation of a further bend at 180° in the direction opposite to that of the former bend, and so on.

7. Automatic assembly machine (10, 110) as in claim 1, characterized in that the hoisting unit (120) comprises a hoisting means (121) with four upper columns (125) on which the work table (101) is laid, and in that it comprises a discharging means (100) for the pile (45) of packages, formed of two continuous longitudinal chains (115, 116) acting respectively on parallel vertical planes on either side of the work table (101) below the work surface (18), distance one from the other being less than the width of the work table (101), said chains being supported at one end by a motor driven shaft (102) worked by an electric ratiomotor (113) so that when a pile (45) of packages has been completed, the hoisting means (121) lowers the work table (101) said table (101) then resting on said chains (115, 116), becoming separated from the hoisting means (121) which descends further and is translated under the work surface (18) as far as one end of the machine (10, 110) for collection of the completed pile (45) and this having been done the chains (115, 116) take the work table (101) back to the hoisting means (121) which, rising, brings it to the opening (28) in the work surface (18) for a further working sequence.

8. Process for assembling a pile (45) of packages (38, 39) for making plastic laminates with metal laminae made from metal bands (12, 13), laid in a serpentine form with bends at 180° between one set and the next (35, 36) of sheets of prepreg and flat intermediate sheets (30–32) between the packages (38, 39), characterized in that the metal bands (12, 13) are fed in from two motor driven reels (20, 22) respectively turning on two carriages (60, 80) sliding along and above a work surface (18) oblong in shape comprising a central aperture (28), associated to insulating bands (14, 15) similarly fed in from two reels (21, 23) respectively supported by said carriages (60, 80) at a level above that of the reels (20, 22) carrying metal bands, and in that the pile (45) of packages is formed on a work table (101) supported by a motor driven hoisting means (121) underneath it, in that two stabilizing devices (150, 151) (181, 182) stabilize the pile (45) during its formation and especially the bands (12–15) at the start of their 180° bend as well as while it is being made, and in that the working sequence takes place as follows: the ends of the two metal bands (12, 13) and of the two insulating bands (14, 15) are laid on the work table (101) having been unwound from the reels (20–23) on the carriages (60–80) placed at one end of the machine, so that the bands lie superimposed in this order from underneath: insulating band (14), copper band (12), copper band (13), insulating band (15), an intermediate sheet (30) is laid over said band ends, the second (151, 182) of the two stabilizing devices moves onto said sheet (30), the second carriage (80) moves to the other end of the machine (10, 110) causing the second pair of copper (13) and insulating (15) bands, held in position by the stabilizing device (151, 182) to make an 180° bend around intermediate sheet (30), a set (35) of sheets of prepreg is laid and then the first carriage (60) similarly moves to the other end of the machine causing the first pair of copper (12) and insulating (14) bands also to make an 180° bend, an intermediate sheet (31) having then been laid and the first stabilizing device (150, 181) having come into action, the first carriage (60) returns to the first end of the machine (10, 110) causing a further bend at 180° to be made by the first paid of bands (12, 14) in the opposite direction to that of the previous bend, the second set (36) of sheets of prepreg having been laid, the second carriage (80) returns to the left hand side of the machine (10, 110) causing the second pair of bands (13, 15) to make a further 180° bend, and so on, these sequences result in construction of a pile (45) of packages (38, 39) consisting of copper (12, 13) and insulating (14, 15) bands laid serpentinewise between sets (35, 36) of sheets of prepreg and intermediate sheets (30–32) and with the copper bands (12, 13) matching with the sets (35, 36) of sheets of prepreg.

9. Pile (45) of packages for plastic laminates each having metal lamine made from a pair of metal bands (12, 13) laid in a serpentine form, and forming bends at 180° facing in one direction and then in the opposite direction, between one set and another set (35, 36) of sheets of prepreg and intermediate flat metal sheets (30, 32) between the packages (38, 39) characterized in that a pair of insulating bands (14, 15) is associated to a pair of metal bands (12, 13), said insulating bands being laid outside the pair of metal bands (12, 13), so that the pile (45) of packages (38, 39) is formed by a succession of:

insulating element (15), metal element (13), set of sheets (35) of prepreg, metal element (12), insulating element (14), intermediate metal sheet (31), insulating element (14), metal element (12), set of sheets (36) of prepreg, metal element (13), insulating element (15), intermediate metal sheet (32) and so on until the pile (45) is completed.

* * * * *